Sept. 23, 1969    C. POOL    3,468,050
CATTLE TAG
Filed March 28, 1967
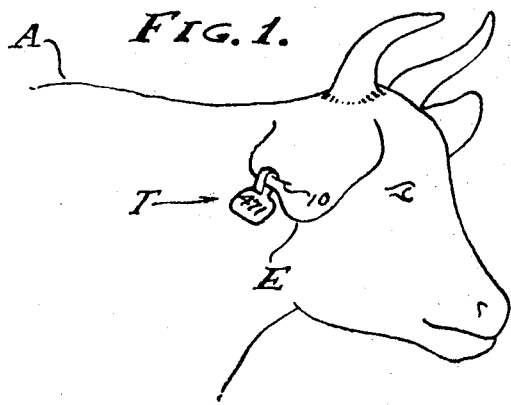
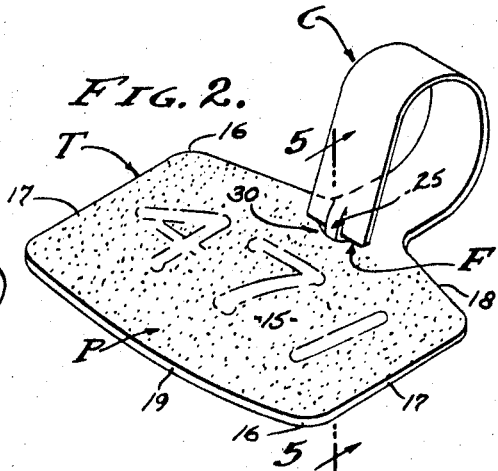
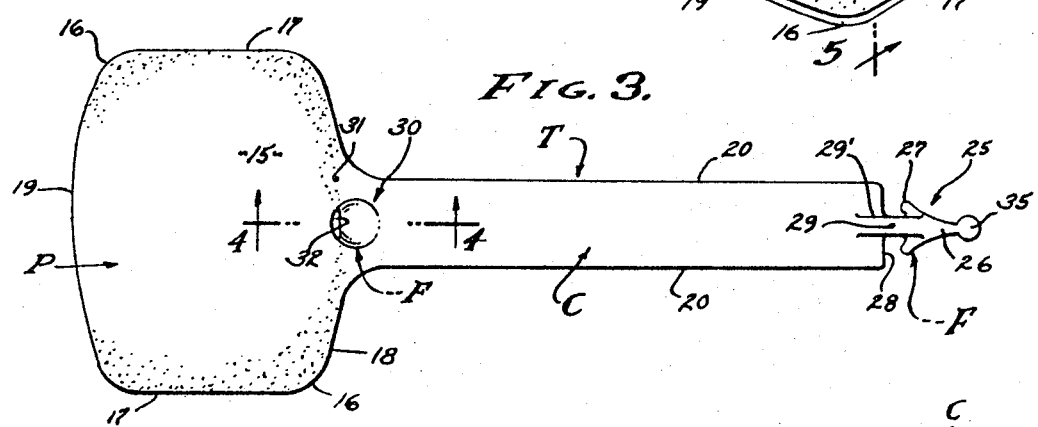
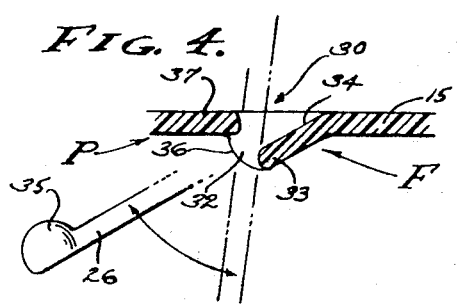
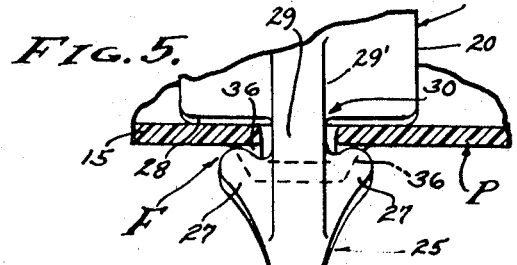
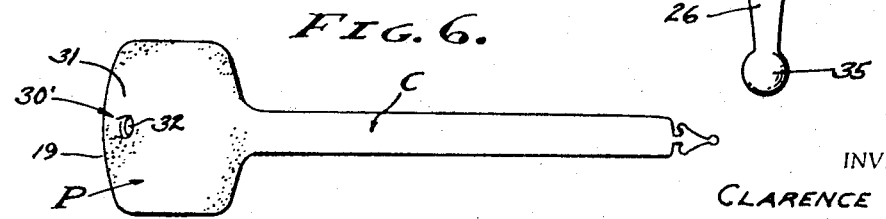
INVENTOR.
CLARENCE POOL
BY
AGENT United States Patent Office 3,468,050
Patented Sept. 23, 1969

3,468,050
CATTLE TAG
Clarence Pool, 8321 Passons Blvd.,
Pico Rivera, Calif. 90660
Filed Mar. 28, 1967, Ser. No. 626,558
Int. Cl. G09f 3/06
U.S. Cl. 40—302                                    4 Claims

ABSTRACT OF THE DISCLOSURE

This invention relates to the identification of cattle and the like and is particularly concerned with tags that are insertable through animal tissue and adapted to retain and make readily available that information which is pertinent to that animal, and provides a one-piece article of supple material in the form of a tag and which includes a coupling portion for embracement of an animal part and with fastener features that facilitate installation and which are reinforced so as to assure a reliably permanent connection to said animal part.

---

The one-piece tag herein disclosed is particularly useful for tagging cattle, as well as for tagging a multitude of other things. In the case of cattle, branding has been universally employed to designate origin and ownership of each animal, and in addition tagging is employed for further application of identifying information to the individual animals. For example, a tag can carry upon it various written or imprinted information pertaining to breeding, time, environment and feeding, etc. And, to this end it is common practice to pierce the ears of animals and to insert a coupling element therethrough and to which an information tag is attached. The said piercing of animal ears is easily accomplished, it being the outer ear or earlap which is cut through as by sliting with a knife, and all of which is accomplished with minimal bleeding and followed by rapid healing with little or no danger of infection. Thus, it will be apparent that the external ear, earlap or earlobe, affords an appendage to which fastening of a tag can be effectively accomplished with little effort.

It is an object of this invention to provide an improved identification tag of the character above referred to and which is itself of supple nature and capable of remaining attached to pierced and/or slit appendages of the animal, such as to the ear.

It is also an object of this invention to provide an identification tag for the purposes herein above described and which is a one-piece construction that includes features to promote as well as to assure proper installation and also to assure a reliable and permanent connection.

It is still another object of this invention to provide a tag structure which advantageously employs a single body of material that is pliant and supple and which also has resilience (sufficient memory) so as to enable the functions of the fastener structure. In practice, a tough plastic material is employed, as later specified, and which retains sufficient rigidity due to its shape at certain portions, but which permits sufficient distension at other certain portions, and all of which permits the operational functions of the tag installation as a whole, as well as the operational functions of the fastener while assuring permanency of the connection or coupling that is attained.

The various objects and features of this invention will be fully understood from the following detailed description of the typical preferred form and application thereof, throughout which description reference is made to the accompanying drawings, in which:

FIG. 1 illustrates the typical tagging of an animal with the tag of the present invention.

FIG. 2 is a perspective view of the tag shown in FIG. 1 and as it would appear removed from the earlap of the animal.

FIG. 3 is a plan view of the tag as it is initially formed.

FIGS. 4 and 5 are sectional views taken as indicated by lines 4—4 and 5—5 on FIGS. 3 and 2, respectively. And, FIG. 6 is a view similar to FIG. 3 and shows a typical modification of the tag.

The tag T of the present invention is shown in FIG. 1 as it would appear when installed in the customary manner through a slit 10 pierced through the earlap E of an animal A. Since the well being of the animal is of prime importance, the tag T is made of pliant and supple material very much in the nature of the animal hide to which it is attached, and to the end that its presence becomes and remains unnoticed to the animal. Otherwise, a disturbing part attached to the animal would be annoying and would result in injury to the animal attempting to dislodge the annoyance. Therefore, a tag T of material having similar physical properties as that of the animal hide and/or flesh is much to be desired; and in this instance a body 15 of, for example, polyurethane, polyvinyl, or nylon plastic is employed and each of which is substantially light weight with a pliability and suppleness about equal to the earlap E of the animal. Furthermore, the heat characteristics of such a plastic body 15 is also about the same as the animal tissue, so that neither heat or cold will have any noticeable effect. Functionally, therefore, the body 15 has substantially the same pliability, suppleness and warmth as does the animal tissue to which it is attached.

The pliant and supple body 15 can vary widely in its specific configuration, and as it is shown in its preferred form it involves, generally, a plate portion P, a coupling portion C, and incorporated in the body 15 there are engageable features comprising a fastener F. The tag T is a one-piece article and to this end the elements P, C and F are integrally formed in the single body 15, of material having substantially uniform physical characteristics throughout. That is, the plate portion P and coupling portion C are integrally joined, being shown formed into a sheet or plate of plastic having uniform thickness, while the features comprising the fastener F are embodied upon or in the body 15 as hereinafter described.

The plate portion P is a flat and extended portion of the body 15, and it is sizable so as to receive and display inscriptions in the form of written and/or printed information. As shown, the plate portion P is preferably enlarged and more or less rectangular, having well-rounded corners 16 joined by said edges 17, and by top and bottom edges 18 and 19, respectively. It is to be understood that the portion P can be a part of area of the coupling portion C, all as circumstances require. In practice, the opposite faces of the sheet plastic are smooth so as to present planished surfaces to which foreign substances will not readily attach, and this being especially so when employing a body 15 of the material above specified. This nonadherence feature is advantageous insofar as the overall structure is concerned, but in the case of the intended functions for the plate P the said smooth and planished surface is distressed and roughened to that writing or printing materials implaced thereon will adhere. Consequently, it is a simple matter to implace identifying information upon both the front and back surface of the said plate portion P.

The coupling portion C is a strap-like projected portion of the body 15, and it is narrow and of substantial length so as to be passed through the slit 10 or a like opening. As shown, the coupling portion C is straight and of uniform width, projecting laterally from the plate portion P. It is preferred that the tag T have symmetry and to this end the said portion C has straight parallel edges 20, the strap formed hereby projecting normally from the center of the top edge 18. With the tag T as thus far described there is a need for capturing the said coupling portion C in a condition embracing a portion of the hide or flesh where it is to be adapted to the animal. Being pliant and/or supple, the said body 15 is itself ordinarily subject to difficulties when such fastening is involved, and resort is usually made to other separate and additional means in order to make satisfactory connection for said embracement.

In accordance with this invention I provide the fastener F which is particularly suited to establish the embracement of the coupling portion C about the hide or flesh at the slit 10 through which it is passed for attachment of the tag T to the animal A. Generally, the fastener F involves spaced male and female members 25 and 30, at opposite ends of the strap-like coupling portion C. The features comprising the male and female members 25 and 30 are imposed upon and/or in the body 15, and in each instance the male and female members 25 and 30 involve enlargements and or embossments of the body 15, this being the characteristic feature of the fastener F for the flat plastic body formed into the two tag portions. Fundamentally, the male member 25 is a dart-shaped member while the female member 30 is a recessed aperture member.

The male member 25 of the fastener F is of dart shape having an arrowhead configuration. Consequently, the member 25 has a point 26 and rearwardly projecting barbs 27. The male member extends centrally from the end 28 of portion C with opposite side barbs 27 establishing a pair of hooks faced rearwardly along a shank 29 of substantial cross section and thickened for strength as indicated at 29'. It is to be understood that the entire structure is preferably made of the one pliant and supple body of plastic material uniform throughout, and that the male member 25 can be deformed as by compressing the barbs 27 inwardly to a degree, the said male member per se being substantially rigid. However, the point 26 of said member is necessarily reduced to a slender configuration and is not in itself a dominant part which can be detected or gripped for manipulation. Therefore, and in accordance with the invention, an enlargement 35 is embossed upon the terminal end of the point 26, and this enlargement projects from at least one and if desired both planar surfaces of the sheet plastic material of body 15, thereby presenting a substantial part for manual engagement.

The female member 30 of the fastener F is a depressed reinforcement at the base end 31 of the coupling portion C, remote from the end 28. In one form (FIGS. 1-5) the said base end 31 is at the juncture of the portions P and C and the member 30 is characteristically an embossment at one face of the sheet plastic material, and which affords a depression at the other end opposite face of said material. Since the female member 30 is particularly adapted to receive said male member, the entire member 30 is disposed on a substantially inclined axis and the depressed face thereof made funnel-shaped for facilitating entry of the male member 25. In another form (FIG. 6) the portion C extends across the portion P and the base end 31 is at the bottom edge 19 thereof, in which case the female member 30' opens at the opposite side of the body and is inclined oppositely.

Since the male member 25 projects from the terminal end of the coupling portion C, the said portion is doubled or folded back upon itself for alignment of member 25 with member 30 (30'), in which case the axis of female member 30 is inclined from the depressed face thereof and in the direction that the portion C extends. Therefore, referring to FIGS. 1–5, the female member 30 is characterized by an opening 32 at the embossed face thereof, said opening 32 being at the narrow end of the funnel-shape and of a cross section corresponding to the cross section of the shank 29. Consequently, the opening 32 is a transversely disposed slot-shaped opening joined at its lower lip 33 to the plane of the sheet plastic material by an inclined ramp 34, and joined to the bottom face of the sheet plastic material at the sides of the reformed area by depending and rearwardly faced lugs 36 that reinforce the body 15 at the ends of the slot and for captured engagement with the barbs 27. It will be seen that the transverse slot-shaped opening 32 is defined by the lower lip 33 that is spaced from an upper lip 37, the latter being at the plane of the bottom face of the sheet plastic material of body 15.

From the foregoing description of the preferred forms of the one-piece cattle tag, it will become apparent that plastic material is advantageously employed, with full utiliztaion of the physical properties of the material from which the body 15 is made. It is significant that the physical properties of the body 15 remain uniform throughout, full advantage being made of the pliant and supple nature of the same. However, the flexibility due to pliability and suppleness is not accepted as a deterrent to a self-contained one-piece article and resort is not made to other fastener means, usually of metal construction. On the contrary, male and female members are imposed on and/or formed in the body 15 and which are characterized by embossments that reform the otherwise flat body of plastic material. In the case of the male member 25 the embossment is the enlargement 35 that affords a sizable part to be manipulated into the funnel-shaped depression at the female member 30. In practice, the enlargement 35 is of deeper cross section than the depth (or width) of the slot-shaped opening 32 and consequently the enlargement is forced through the opening by distending the lips 33 and 37, and when passed through the opening this affords an initial detent function that temporarily holds the male member in position.

Following the initial insertion of the male member 25 into the temporary detented position, a finger grip is established at the embossed face of the female member 30 and substantial pulling force is applied to the enlargement. The material of body 15 is tough with no danger of separation of parts, and the pulling action draws the barbs 27 through the opening 32. Consequently, the barbs 27 compress together and simultaneously distend the ends of slot 32 at the sides of the female member, while passage of the dart-shaped or arrowhead is being effected. After said passage, the resilience of the material of body 15 causes the members 25 and 30 to resume their initial form, as hereinabove described, whereupon the end 18 of coupling portion C engages the top face at the base end 31 while the hook-shaped barbs 27 engage behind the reinforcing lugs 36, capturing the male member in working position. A feature of the fastener member relationship is the wide range of articulation, as is clearly illustrated in FIG. 4, and whereby the male member 25 pivots freely in the inclined female member 30, so as to seek the most desirable pulling angle as will be caused by the flattening of the loop due to continued use. Thus, the coupling portion C is loop-shaped and having been passed through the slit 10 the tag T is then attached to the animal A.

Having described only a typical preferred form and application of my invention, I do not wish to be limited or restricted to the specific details herein set forth, but wish to reserve to myself any modifications or variations that may appear to those skilled in the art.

Having described my invention, I claim:

1. An information tag for attachment to and by embracement of a part, and including: a sheet-like body of pliant and supple material, having a plate portion for the inscription of information thereon, and having a coupling portion of strap-like form with opposite faces and projecting from the plate portion at a base end and with a free manipulatable end; and a fastener for securing the free end of the coupling portion to the opposite base end thereof and comprising, a male member at said free end of the coupling portion and a female member formed by a depression in one face of the base end of the coupling portion and by a corresponding embossment from the other face thereof, said male member having opposite side barbs faced rearwardly of the coupling portion, said female member having an opening therethrough between the faces of the base end of the coupling portion and with opposite reinforcement lugs depending from a face of the base end of the coupling portion at either side of the opening therethrough and with an inclined ramp extended from the coupling portion and between the reinforcement lugs and terminating in a lip spaced from said other face of the base end of the coupling portion; said coupling portion being manipulatable to be looped backward to embrace said part with said male member inserted through the opening between said lugs and defined by said lip spaced from said other face and captured in the female member with said barbs engaged with said lugs, thereby securing the free end of the coupling portion to the base end thereof.

2. An information tag as set forth in claim 1, wherein the ramp is rearwardly convergent and the opening between said lugs is of convergent funnel-shaped form.

3. An information tag as set forth in claim 1, wherein the barbs of the male member of the fastener are hook-shaped, and wherein said hook-shaped barbs are engaged partially around the reinforcement lugs of the female member.

4. An information tag as set forth in claim 1, wherein the barbs of the male member of the fastener are hook-shaped, wherein the ramp of the female member is rearwardly convergent and the opening between said lugs is of convergent funnel-shaped form and terminates in a narrowed lip, and wherein said hook-shaped barbs are engaged partially around the reinforcement lugs of the female member.

References Cited

UNITED STATES PATENTS

| | | | |
|---|---|---|---|
| 627,920 | 6/1899 | Gould | 40—21 |
| 2,153,227 | 4/1939 | Allstatter | 40—21 |
| 2,325,906 | 8/1943 | Claffey | 40—302 |
| 2,818,665 | 1/1958 | Barger | 40—302 |
| 2,961,785 | 11/1960 | Toepfer | 40—21 |
| 3,352,040 | 11/1967 | Javkin | 40—21 |

FOREIGN PATENTS

| | | |
|---|---|---|
| 123,192 | 1/1931 | Austria. |
| 795,492 | 5/1958 | Great Britain. |

LAWRENCE CHARLES, Primary Examiner